United States Patent
Saka et al.

(10) Patent No.: US 8,795,889 B2
(45) Date of Patent: Aug. 5, 2014

(54) TRANSITION METAL PHOSPHATE, PRODUCTION PROCESS THEREOF, POSITIVE ELECTRODE, AND SODIUM SECONDARY BATTERY

(75) Inventors: Maiko Saka, Tsukuba (JP); Yuichiro Imanari, Tsukuba (JP); Taketsugu Yamamoto, Tsukuba (JP)

(73) Assignee: Sumitomo Chemical Company, Limited, Tokyo (JP)

(*) Notice: Subject to any disclaimer, the term of this patent is extended or adjusted under 35 U.S.C. 154(b) by 241 days.

(21) Appl. No.: 13/003,280

(22) PCT Filed: Jul. 7, 2009

(86) PCT No.: PCT/JP2009/062648
§ 371 (c)(1), (2), (4) Date: Jan. 7, 2011

(87) PCT Pub. No.: WO2010/005097
PCT Pub. Date: Jan. 14, 2010

(65) Prior Publication Data
US 2012/0276438 A1 Nov. 1, 2012

(30) Foreign Application Priority Data

Jul. 9, 2008 (JP) ................................ 2008-179605
Jul. 9, 2008 (JP) ................................ 2008-179607

(51) Int. Cl.
*H01M 4/13* (2010.01)

(52) U.S. Cl.
USPC ........................ 429/218.1; 429/223; 429/224

(58) Field of Classification Search
USPC .............................. 429/144, 223, 224, 218.1
See application file for complete search history.

(56) References Cited

U.S. PATENT DOCUMENTS

| 5,686,203 | A  | * | 11/1997 | Idota et al. ............... 429/342 |
| 6,447,958 | B1 |   | 9/2002  | Shinohara et al. |
| 6,872,492 | B2 |   | 3/2005  | Barker et al. |
| 2004/0018135 | A1 | * | 1/2004 | Adamson et al. ............ 423/313 |
| 2005/0238961 | A1 | * | 10/2005 | Barker et al. ............. 429/231.4 |
| 2008/0153002 | A1 | * | 6/2008 | Nazar et al. ............... 429/221 |
| 2010/0248001 | A1 | * | 9/2010 | Kuze et al. ................ 429/144 |

FOREIGN PATENT DOCUMENTS

| EP | 2 239 806 A1 | 10/2010 |
| JP | 10-324758 A | 12/1998 |
| JP | 2000-030686 A | 1/2000 |
| JP | 2000-294238 A | 10/2000 |

(Continued)

OTHER PUBLICATIONS

Extended European Search Report issued in Patent Application No. 09794540.6, dated Jul. 27, 2012.
Stephen E. Ziemniak, et al., "Hydrothermal Synthesis of Maricite via Iron Oxide Decomposition in Sodium Phosphate Solutions", PowerPlant Chemistry, 2003, pp. 69-74, vol. 5, No. 2.
John N. Bridson, et al., "Synthesis and Crystal Structure of Maricite and Sodium Iron (III) Hydroxyphosphate", Chem. Mater, 1998, pp. 763-768, vol. 10.

(Continued)

*Primary Examiner* — Jane Rhee
(74) *Attorney, Agent, or Firm* — Sughrue Mion, PLLC

(57) ABSTRACT

The present invention provides a transition metal phosphate and a production process thereof, a positive electrode, and a sodium secondary battery. The transition metal phosphate contains sodium (Na), phosphorus (P) and a transition metal element and having a BET specific surface area of 1 m$^2$/g to 50 m$^2$/g. The process for producing a transition metal phosphate comprises steps (1) and (2): (1) a step of bringing a phosphorus (P) source, a sodium (Na) source, an M source (M is one or more transition metal elements) and water into contact with each other, and obtaining a liquid material thereby, and (2) a step of separating water from the liquid material and obtaining a transition metal phosphate thereby.

16 Claims, 8 Drawing Sheets

(56) References Cited

FOREIGN PATENT DOCUMENTS

| JP | 2004-533706 A | 11/2004 |
|----|---------------|---------|
| JP | 2005-047751 A | 2/2005  |
| JP | 2008-260666 A | 10/2008 |
| JP | 2009-104970 A | 5/2009  |
| JP | 2009-206085 A | 9/2009  |
| JP | 2010-020987 A | 1/2010  |

OTHER PUBLICATIONS

Katsutoshi Abiko, et al., "Synthesis and Carbon Coating Effect of Olivine-Type $LiFePO_4$ Prepared by Aqueous Solution Method", Summary of 48th Battery Symposium in Japan, pp. 56-57, The Electrochemical Society of Japan, The Committee of Battery Technology.

Japanese Office Action mailed on Oct. 1, 2013 in corresponding Japanese Application No. 2008-179605.

Japanese Office Action mailed on Oct. 1, 2013 in corresponding Japanese Application No. 2008-179607.

* cited by examiner

F I G.1
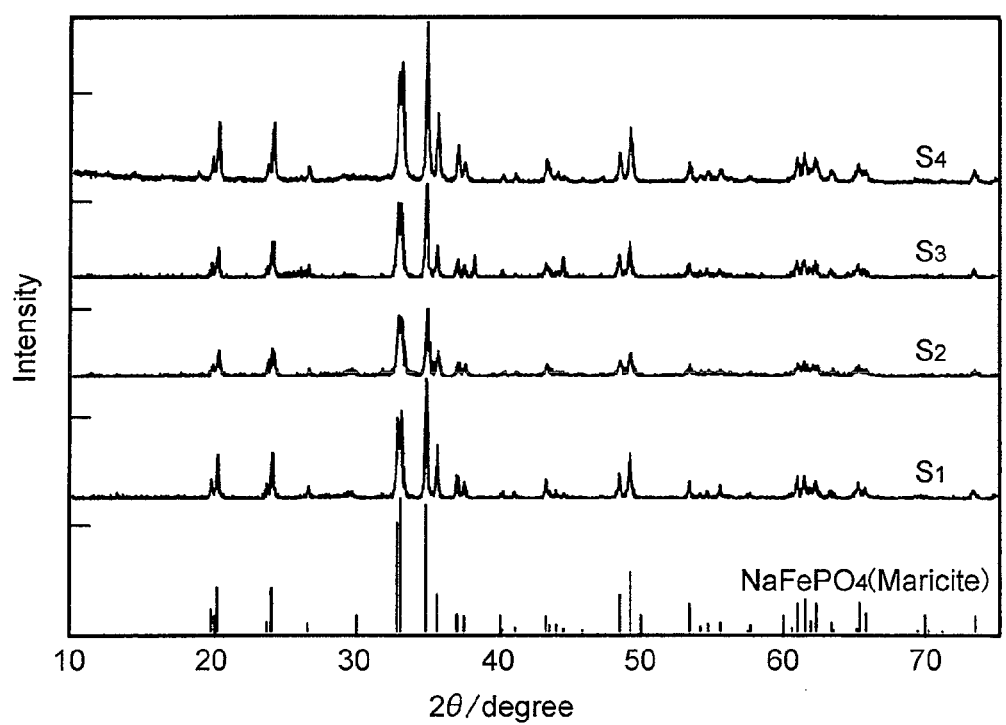

×20000  1μm

×20000  1μm

F I G.7
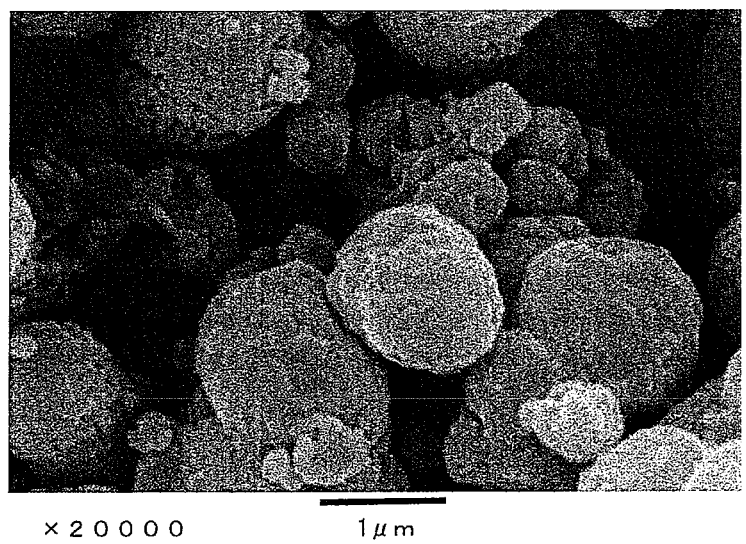

TRANSITION METAL PHOSPHATE, PRODUCTION PROCESS THEREOF, POSITIVE ELECTRODE, AND SODIUM SECONDARY BATTERY

CROSS REFERENCE TO RELATED APPLICATIONS

This application is a National Stage of International Application No. PCT/JP2009/062648, filed on Jul. 7, 2009, which claims priority from Japanese Patent Application No. 2008-179605 filed on Jul. 9, 2008 and Japanese Patent Application No. 2008-179607, filed on Jul. 9, 2008, the contents of all of which are incorporated herein by reference in their entirety.

TECHNICAL FIELD

The present invention relates to a transition metal phosphate, a production process thereof, a positive electrode, and a sodium secondary battery.

BACKGROUND ART

A nonaqueous electrolyte secondary battery, particularly a lithium secondary battery, has been put into practical use and is being widely used as a small power source for cellular phones, notebook computers and the like. Also, demands for a nonaqueous electrolyte secondary battery as a large power source for electric vehicles, distributed power storages and the like are on the rise.

However, lithium used in the lithium secondary battery is not an abundant resource, and future depletion of lithium resources is feared. On the other hand, sodium belonging to the same alkali metal is present abundantly as a recourse compared with lithium and one digit lower in the price than lithium. Furthermore, sodium has a relatively high standard potential, and therefore it is expected that the sodium secondary battery can be a high-capacity secondary battery. Examples of the sodium secondary battery include a secondary battery using a sodium-containing positive electrode active material for the positive electrode and using metallic sodium or sodium alloy for the negative electrode; and a secondary battery using a sodium-containing positive electrode active material for the positive electrode, and using a carbonaceous material or the like for the negative electrode. If a sodium secondary battery can be used in place of the existing lithium secondary battery, this enables mass production of a large secondary battery such as in-vehicle secondary battery and secondary battery for distributed power storages, without fear of resource depletion.

Meanwhile, as a positive electrode active material used for the positive electrode of a sodium secondary battery, it is disclosed, for example in Japanese National Patent Publication No. 2004-533706, that raw materials are mixed and calcined at 750° C. for 8 hours and obtaining sodium iron phosphate (NaFePO$_4$) thereby, and the sodium iron phosphate is used for the positive electrode active material.

DISCLOSURE OF THE INVENTION

However, such a transition metal phosphate by conventional techniques as disclosed in the publication above is insufficient in view of discharge capacity of a battery, even when the phosphate is used for the positive electrode active material of a secondary battery. Under these circumstances, an object of the present invention is to provide a transition metal phosphate being inexpensive and suitably usable as a positive electrode active material of a high-capacity sodium secondary battery, and a production process thereof. Another object of the present invention is to provide a positive electrode for sodium secondary batteries, and a sodium secondary battery.

The present inventors have continued intensive studies to solve the above-described problems, and thereby accomplished the present invention.

That is, the present invention provides <1> to <17> below.

<1> A transition metal phosphate, containing sodium (Na), phosphorus (P) and a transition metal element, and having a BET specific surface area of 1 m$^2$/g to 50 m$^2$/g.

<2> The transition metal phosphate as described in <1>, having an orthorhombic crystal structure.

<3> The transition metal phosphate as described in <1> or <2>, represented by the following formula (I):

$$Na_xM_yPO_4 \qquad (I)$$

wherein
x is from more than 0 and not more than 1.5,
y is from 0.8 to 1.2, and
M is one or more transition metal elements.

<4> The transition metal phosphate as described in <3>, wherein M contains Fe or Mn.

<5> The transition metal phosphate as described in any one of <1> to <4>, wherein the transition metal phosphate is composed of particles, and D50 of the particles is from 0.01 to 50 μm (D50 indicates the value of particle diameter at which the cumulative volume calculated from the smallest particle diameter side reaches 50% in the volume-based cumulative particle size distribution).

<6> A positive electrode active material for sodium secondary batteries, the material comprising the transition metal phosphate described in any one of <1> to <5>.

<7> A positive electrode for sodium secondary batteries, the electrode comprising the positive electrode active material described in <6>.

<8> A sodium secondary battery, comprising the positive electrode described in <7>.

<9> The sodium secondary battery as described in <8>, which further comprises a separator.

<10> The sodium secondary battery as described in <9>, wherein the separator comprises a porous laminate film in which a heat-resistant porous layer containing a heat-resistant resin, and a porous film containing a thermoplastic resin are stacked each other.

<11> A process for producing a transition metal phosphate, the process comprising the following steps (1) and (2):

(1) a step of bringing a phosphorus (P) source, a sodium (Na) source, an M source (M is one or more transition metal elements) and water into contact with each other, and obtaining a liquid material thereby, and (2) a step of separating water from the liquid material and obtaining a transition metal phosphate thereby.

<12> The production process as described in <11>, wherein, in the step (1), an aqueous solution containing P and Na is brought into contact with an M compound or an aqueous solution containing an M compound and obtain the liquid material thereby.

<13> The production process as described in <11>, wherein, in the step (1), an aqueous solution containing Na and M is brought into contact with an aqueous solution containing P and obtain the liquid material thereby.

<14> The production process as described in any one of <11> to <13>, wherein M contains a divalent transition metal element.

<15> The production process as described in any one of <11> to <14>, wherein M contains Fe or Mn.

<16> The production process as described in <11>, wherein the step (2) comprises evaporating water.

<17> The production process as described in <16>, wherein the evaporation is performed by heating.

BRIEF DESCRIPTION OF THE DRAWINGS

FIG. 1 shows powder X-ray diffraction analysis results in Examples 1 to 4.

FIG. 7 shows an SEM observation photograph in Example 5.

Figure 2:
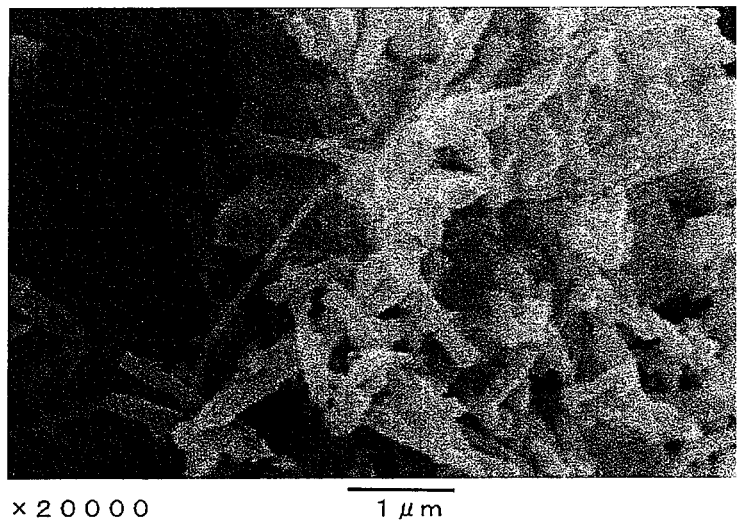
FIG. 2 shows an SEM observation photograph in Example 1.

MODE FOR CARRYING OUT THE INVENTION
TRANSITION METAL PHOSPHATE

The transition metal phosphate of the present invention contains sodium (Na), phosphorus (P) and a transition metal element.

The transition metal phosphate has a BET specific surface area of 1 m²/g to 50 m²/g. If the BET specific surface area is less than 1 m²/g, the resultant sodium secondary battery suffers from low discharge capacity, whereas if it exceeds 50 m²/g, a filling property becomes worse when an electrode sheet is formed from the transition metal phosphate, and the discharge capacity of the resultant sodium secondary battery is insufficient. In view of increasing the discharge capacity, the BET specific surface area of the transition metal phosphate is preferably 3 m²/g or more, more preferably 5 m²/g or more, still more preferably 10 m²/g or more. From the standpoint that the filling property is enhanced when an electrode sheet is formed from the transition metal phosphate, the BET specific surface area is preferably 45 m²/g or less, more preferably 40 m²/g or less. By setting the BET specific surface area to the value above, an electrical conduction path between particles can be ensured, and a sodium secondary battery capable of exhibiting a high discharge capacity can be obtained.

In order to obtain a transition metal phosphate with a small amount of impurity crystal phases, the transition metal phosphate preferably has an orthorhombic crystal structure. The orthorhombic crystal structure includes crystal structures belonging to space groups selected from the followings: P222, P222$_1$, P2$_1$2$_1$2, P2$_1$2$_1$2$_1$, C222$_1$, C222, F222, I222, I2$_1$2$_1$2$_1$, Pmm2, Pmc2$_1$, Pcc2, Pma2, Pca2$_1$, Pnc2, Pmn2$_1$, Pba2, Pna2$_1$, Pnn2, Cmm2, Cmc2$_1$, Ccc2, Amm2, Abm2, Ama2, Aba2, Fmm2, Fdd2, Imm2, Iba2, Ima2, Pmmm, Pnnn, Pccm, Pban, Pmma, Pnna, Pmna, Pcca, Pbam, Pccn, Pbcm, Pnnm, Pmmn, Pbcn, Pbca, Pnma, Cmcm, Cmca, Cmmm, Cccm, Cmma, Ccca, Fmmm, Fddd, Immm, Ibam, Ibca and Imma. From the standpoint that the capacity of the resultant sodium secondary battery is high, the orthorhombic crystal structure is preferably a crystal structure belonging to space group Pnma.

In order to obtain a sodium secondary battery having an increased capacity, the transition metal phosphate is preferably represented by the following formula (I):

$$Na_xM_yPO_4 \qquad (I)$$

In formula (I), x is more than 0 and not more than 1.5, y is from 0.8 to 1.2, and M is one or more transition metal elements.

In formula (I), M can be one or more elements arbitrarily selected from transition metal elements. Examples of the transition metal element include Ti, V, Cr, Mn, Fe, Co, Ni and Cu. For the reason that a high-capacity sodium secondary battery is obtained when using the transition metal phosphate as the positive electrode active material, M is preferably a divalent transition metal element.

Also, in view of capability to obtain a high-capacity inexpensive secondary battery, in formula (I), M preferably contains at least Fe or Mn, and it is more preferred that M be Fe and/or Mn.

In formula (I), the value of x can be selected from the range of more than 0 and not more than 1.5, and is preferably from 0.8 to 1.2, more preferably 1. Also, the value of y can be selected from the range of 0.8 to 1.2, and is preferably from 0.9 to 1.1, more preferably 1.

The transition metal phosphate is usually a particulate substance (usually a powder) composed of primary particles and aggregated particles formed by aggregation of primary particles, and D50 thereof can be determined by laser diffraction scattering particle size distribution measurement. D50 means a particle diameter at which the cumulative volume calculated from the smallest particle diameter side reaches 50% in the volume-based cumulative particle size distribution. D50 of the transition metal phosphate particulate substance is preferably from 0.01 to 50 μm. If D50 is less than 0.01 μm or more than 50 μm, in use for a sodium secondary battery, the battery may fail in obtaining a sufficient output at a high current rate. In view of increasing the discharge capacity, D50 of the transition metal phosphate particulate substance is preferably 0.03 μm or more, more preferably 0.05 μm or more, still more preferably 0.1 μm or more. Since the electrical conduction path tends to increase when used as a positive electrode active material for sodium secondary batteries, D50 is preferably 30 μm or less, more preferably 10 μm or less, still more preferably 3 μm or less. With D50 in this range, a secondary battery capable of exhibiting a high discharge capacity can be obtained.

The transition metal phosphate usually has a spherical or bar-like particle shape, and, assuming that the long axis of a particle is "a" and the short axis is "b", the aspect ratio a/b is usually about 1 to 100. The particle shape of the transition metal phosphate can be confirmed by SEM observation.

A part of Na, P or the transition metal element of the transition metal phosphate may be substituted with other elements, within the range not impairing the object of the present invention. Other elements include elements such as Li, B, C, N, F, Mg, Al, Si, S, Cl, K, Ca, Sc, Zn, Ga, Ge, Rb, Sr, Y, Zr, Nb, Mo, Tc, Ru, Pd, Rh, Ag, In, Sn, I, Ba, Hf, Ta, W, Ir and Ln (lanthanoid).

The transition metal phosphate may be subjected to a surface treatment of, for example, causing a compound containing one or more elements selected from B, Al, Mg, Ga, In, Si, Ge, Sn, Nb, Ta, W, Mo and transition metal elements to deposit on the surface of the particle (core material). Among these elements, one or more elements selected from B, Al, Mg, Mn, Fe, Co, Ni, Nb, Ta, W and Mo are preferred, and in view of operability, Al is more preferred. Examples of the compound include an oxide, a hydroxide, an oxyhydroxide, a carbonate, a nitrate and an organic acid salt of the elements above, and a mixture thereof. Among these, an oxide, a hydroxide, an oxyhydroxide, a carbonate and a mixture thereof are preferred, and alumina is more preferred.

In the case where the transition metal phosphate is heat-treated after the deposition treatment, the BET specific surface area of the powder after deposition <and> heat treatments sometimes becomes smaller than the range of BET specific surface area before treatments.

Production Process of Transition Metal Phosphate

The transition metal phosphate above can be produced by the process comprising the following steps:
(1) a step of brining a P source, an Na source, an M source (M is one or more transition metal elements) and water into contact with each other, and obtaining a liquid material thereby, and
(2) a step of separating water from the liquid material and obtaining a transition metal phosphate thereby.

Step (1)

As the P source, the Na source and the M source, a P compound, an Na compound and an M compound may be used respectively, or elemental substances of P, Na and M may be used. In the step (1), a liquid material is obtained, for example, by bringing a P compound, a Na compound, a M compound and water into contact with each other. The liquid material may be an aqueous solution where the solute is completely dissolved, or may be a solid-liquid mixture containing a solid content precipitated after the dissolution.

A composite compound containing P and Na may be used in place of the P compound and the Na compound, a composite oxide containing P and M may be used in place of the P compound and the M compound, and a composite oxide containing Na and M may be used in place of the Na compound and the M compound. Examples of the composite oxide containing P and Na include $NaH_2PO_4$, $Na_2HPO_4$ and $Na_3PO_4$, and examples of the compound containing M and P include a phosphate of M (e.g., iron phosphate, manganese phosphate). Among these composite oxides, $NaH_2PO_4$ is useful.

A P compound is usually used as the P source, and elemental P such as red phosphorus and black phosphorus may also be used. The P compound is not particularly limited as long as it is a compound containing P, and examples thereof include an oxide such as $P_2O_5$ and $P_4O_6$; a halide such as $PCl_5$, $PF_5$, $PBr_5$ and $PI_5$; an oxyhalide such as $POF_3$, $POCl_3$ and $POF_3$; an ammonium salt such as $(NH_4)_2HPO_4$ and $(NH_4)H_2PO_4$; and a phosphoric acid such as $H_3PO_4$.

From the standpoint that the reactivity with the Na source and/or the M source is enhanced, the P compound is preferably used as an aqueous solution obtained by dissolving the compound in water (hereinafter, sometimes referred to as an "aqueous P compound solution"). For example, in the case of using an ammonium salt or the like of P, the aqueous P compound solution may be prepared by dissolving the ammonium salt in water. In the case where the P compound is difficult to be dissolved in water, for example, in the case of an oxide, the aqueous P compound solution may be prepared by dissolving the P compound in an acidic aqueous solution of an organic or organic acid such as hydrochloric acid, sulfuric acid, nitric acid and acetic acid. Two or more compounds out of the water-soluble compounds and the compounds difficult to be dissolved may be used in combination. The P compound is preferably $(NH_4)_2HPO_4$ and/or $(NH_4)H_2PO_4$ because an aqueous P compound solution is obtained by an easy and simple method, and $(NH_4)_2HPO_4$ is more preferred in that a transition metal phosphate with a high crystal purity is obtained.

As for the Na source, an Na compound is usually used, and elemental Na (metallic Na) may also be used. The Na compound is not particularly limited as long as it is a compound containing Na, and examples thereof include an oxide such as $Na_2O$ and $Na_2O_2$; a hydroxide such as NaOH; a halide such as NaCl and NaF; a nitrate such as $NaNO_3$; a sulfate such as $Na_2SO_4$; a carbonate such as $Na_2CO_3$ and $NaHCO_3$; an oxalate such as $Na_2C_2O_4$; and an acetate such as $Na(CH_3COO)$.

From the standpoint that the reactivity with the P source and/or the M source is enhanced, the Na compound is preferably used as an aqueous solution obtained by dissolving the compound in water (hereinafter, sometimes referred to as an "aqueous Na compound solution"). For example, in the case of using a water-soluble compound such as oxide, hydroxide and halide, the aqueous Na compound solution may be produced by dissolving the Na compound in water. In general, many Na compounds are easily soluble in water, but in the case of a compound difficult to be dissolved, the aqueous Na compound solution may be prepared by dissolving the compound in an acidic aqueous solution of an inorganic or organic acid such as hydrochloric acid, sulfuric acid, nitric acid and acetic acid. Two or more compounds out of the water-soluble compounds and the compounds difficult to be dissolved may be used in combination. The Na compound is preferably NaOH and/or NaCl because an aqueous Na compound solution is obtained by an easy and simple method, and NaOH is more preferred in that, as described later, the aqueous Na compound solution is preferably alkaline.

As the M source (M is a transition metal element), an M compound is usually used, and elemental M (metallic M) may also be used. Examples of the transition metal element M include Ti, V, Cr, Mn, Fe, Co, Ni and Cu. M is preferably a divalent transition metal element because a high-capacity secondary battery is obtained when the obtained transition metal phosphate is used as the positive electrode active material. M more preferably contains Fe or Mn, and M is still more preferably Fe and/or Mn. The M compound is not particularly limited as long as it is a compound containing M, and examples thereof include an oxide such as MO, $MO_2$, $M_2O_3$ and $MO_4$; a hydroxide such as $M(OH)_2$ and $M(OH)_3$; an oxyhydroxide such as MOOH; a halide such as $MF_2$, $MF_3$, $MCl_2$, $MCl_3$, $MI_2$ and $MI_3$; a nitrate such as $M(NO_3)_2$ and $M(NO_3)_3$; a sulfate such as $M(SO_4)$ and $M_2(SO_4)_3$; a carbonate such as $MCO_3$; an oxalate such as $MC_2O_4$; an acetate such as $M(CH_3COO)_2$ and $M(CH_3COO)_3$; a formate such as $M(HCOO)_2$; a propionate such as $M(C_2H_5COO)_2$; a malonate such as $M(CH_2(COO)_2)$; and a succinate such as $M(C_2H_4(COO)_2)$.

From the standpoint that the reactivity with the P source and/or the Na source is enhanced, the M compound is preferably an aqueous solution obtained by dissolving the compound in water (hereinafter, sometimes referred to as an "aqueous M compound solution"). For example, in the case of using a water-soluble compound such as halide, nitrate, sulfate, oxalate and acetate, the aqueous M compound solution may be produced by dissolving the M compound in water. In the case where the M compound is difficult to be dissolved in water, for example, when the M compound is an oxide, a hydroxide, an oxyhydroxide or a carbonate, the aqueous M compound solution may be prepared by dissolving the compound in an acidic aqueous solution of an inorganic or organic acid such as hydrochloric acid, sulfuric acid, nitric acid and acetic acid. Two or more compounds out of the water-soluble compounds and compounds difficult to be dissolved may be used in combination. The M compound is preferably a halide, because an aqueous M compound solution is obtained by an easy and simple method, and $MCl_2$ is more preferred.

In the step (1), for example, an aqueous solution containing P and Na is brought into contact with an aqueous solution containing an M compound to obtain a liquid material. The aqueous solution containing P and Na may be prepared by selecting arbitrary substances from elemental P, elemental Na, P compounds and Na compounds, and then dissolving them in water. The aqueous solution containing P and Na may be an aqueous solution formed by bringing a composite compound containing P and Na into contact with water.

In the step (1), it is also possible to bring an aqueous solution containing Na and M into contact with an aqueous solution containing P to obtain a liquid material. The aqueous solution containing Na an M may be produced by selecting arbitrary substances form elemental Na, elemental M, Na compounds and M compounds, and then dissolving them in water. The aqueous solution containing Na and M may be an aqueous solution formed by brining a composite compound containing Na and M into contact with water.

In the step (1), it is also possible to bring an aqueous P compound solution, an aqueous Na compound solution and an aqueous M compound solution into contact with each other to obtain a liquid material. The aqueous P compound solution, the aqueous Na compound solution and the aqueous M compound solution may be prepared by arbitrarily selecting a required compound and dissolving the compound in water.

As described above, the P compound, the Na compound and the M compound are preferably used as aqueous solutions containing respective compounds, because a liquid material where the p compound, the Na compound and the M compound are uniformly reacted is obtained. In particular, the M compound is preferably used as an aqueous solution. The liquid material may contain components other than P, Na, M and water within the range not impairing the object of the present invention.

With regard to a specific example of the step (1), a method using diammonium hydrogenphosphate $((NH_4)_2HPO_4)$ as the P compound, sodium hydroxide (NaOH) as the Na compound, and iron(II) chloride tetrahydrate $(FeCl_2 \cdot 4H_2O)$ as the M compound is described below.

For example, in the production of sodium iron phosphate represented by $NaFePO_4$ that is one preferred composition, sodium hydroxide, iron (II) chloride tetrahydrate and diammonium hydrogenphosphate are weighed to give a predetermined Na:Fe:P molar ratio, the weighed compounds are each completely dissolved in ion-exchanged water to prepare aqueous solutions containing respective compounds, and the aqueous diammonium hydrogenphosphate solution and the aqueous sodium hydroxide solution are brought into contact with each other to prepare a mixed aqueous solution containing P and Na. Usually, a solid material can be hardly present in the mixed aqueous solution at this point. Subsequently, the mixed aqueous solution and the aqueous iron (II) chloride solution are brought into contact with each other to obtain a liquid material. Usually, the liquid material at this point is a solid-liquid mixture containing a solid material. Incidentally, although the reasons are not clear, the aqueous Na compound solution preferably has a alkaline pH so as to reduce impurity phases, when obtaining a solid-liquid mixture.

The order of contact between respective aqueous solutions is not limited to the above order. A method of bringing the aqueous sodium hydroxide solution into contact with the aqueous iron (II) chloride solution to obtain a mixed aqueous solution containing Na and Fe, and then bringing the aqueous diammonium hydrogenphosphate solution into contact with the mixed aqueous solution to obtain a liquid material may be employed; and a method of bringing the aqueous diammonium hydrogenphosphate into contact with the aqueous iron (II) chloride solution to prepare a mixed aqueous solution containing P and Fe, and then bringing the aqueous sodium hydroxide solution into contact with the mixed aqueous solution to obtain a liquid material may be employed.

In the step of obtaining a mixed aqueous solution and/or a liquid material, stirring can be performed by any method. Examples of the mixing device include a stirrer, a stirring blade, a V-type mixing machine, a W-type mixing machine, a ribbon mixer, a drum mixer and a ball mill.

In the case of using the transition metal phosphate as a positive electrode active material, the liquid material preferably contains an electrically conductive material. Examples of the electrically conductive material include a carbonaceous material such as natural graphite, artificial graphite, cokes and carbon black, and an electrically conductive polymer material. By incorporating an electrically conductive material into the liquid material, the electrically conductive property of the transition metal phosphate is significantly enhanced, and, when used for the positive electrode of a sodium secondary battery, the discharge capacity of thereof is increased.

In the case of using the transition metal phosphate as the positive electrode of a sodium secondary battery, a substance containing an element other than Na, P and M may be added to the liquid material to substitute a part of Na, P and M of the transition metal phosphate with other elements, within a range capable of maintaining the high discharge capacity. The other elements include elements such as Li, B, C, N, F, Mg, Al, Si, S, Cl, K, Ca, Sc, Zn, Ga, Ge, Rb, Sr, Y, Zr, Nb, Mo, Tc, Ru, Pd, Rh, Ag, In, Sn, I, Ba, Hf, Ta, W, Ir and Ln (lanthanoid).

In the step (1), the liquid material may be heated. By heating, the reaction of the p source, the Na source and the M source may be enhanced. The temperature of the heating is preferably from 40 to 100° C. The liquid material is preferably heated while stirring and/or mixing in order to enhance the reaction accelerating effect.

The atmosphere in which the liquid material is heated is not particularly limited, and examples thereof include an oxidizing atmosphere containing oxygen, an air atmosphere, an inert atmosphere containing nitrogen, argon or the like, and a reducing atmosphere containing hydrogen. That is, an oxidizing atmosphere may be prepared by appropriately mixing oxygen and nitrogen, oxygen and argon, or the like, or a reducing atmosphere may be prepared by appropriately mixing hydrogen and nitrogen, hydrogen and argon, or the like. An air atmosphere that is simple and easy to prepare is usually selected.

Step (2)

In the step (2), water is separated from the liquid material obtained in the step (1). The separation is not particularly limited, and includes, for example, filtration, centrifugal separation and evaporation of water. The step (2) preferably comprises a evaporation of water, and water is finally evaporated by heating, reduced pressure, natural drying or the like, whereby a dried transition metal phosphate can be obtained. In particular, the method of evaporating water by heating is preferred, because a homogeneous transition metal phosphate can be easily obtained.

The step (2) may comprise the following separation step. In the case where the liquid material is a solid-liquid mixture containing a solid content, the solid content is separated from the liquid material by filtration, centrifugal separation or the like, and water is then evaporated from the solid content, whereby a dried transition metal phosphate is obtained.

The atmosphere of the step (2) is not particularly limited, and can be optionally selected from, for example, an oxidizing atmosphere containing oxygen, an air atmosphere, an inert atmosphere containing nitrogen, argon or the like, and a reducing atmosphere containing hydrogen. When the step (2) is performed in an air atmosphere, a transition metal phosphate can be easily produced.

A step of heating the liquid material to evaporate and thereby remove water therefrom (hereinafter, sometimes referred to as a heating step), which is suitable for the separation of water from the liquid material, is described below.

In view of evaporation rate of water from the liquid material and chemical stability of the obtained transition metal phosphate, the heating temperature is preferably from 50° C. to 250° C., more preferably from 80° C. to 200° C., still more preferably from 90° C. to 180° C. It is also possible to reach the heating temperature above rapidly within the range not breaking the vessel containing the liquid material.

The obtained transition metal phosphate may be washed. A solvent used for washing is preferably water, more preferably pure water and/or ion-exchanged water. After the washing with pure water and/or ion-exchanged water, the transition metal phosphate is dried, whereby a transition metal phosphate free of water-soluble impurities and the like can be obtained. The preferred range of drying temperature is the same as the above-described range of heating temperature. The drying atmosphere is not particularly limited, and is air, oxygen, nitrogen, argon or a mixed gas thereof, preferably an inert or a reducing atmosphere containing no oxygen. Drying may also be performed in a reduced-pressure atmosphere. Washing and drying may be repeated twice or more, and after the drying, calcination may be performed.

In the case of using the obtained transition metal phosphate as a positive electrode active material, for example, as a positive electrode active material for sodium secondary batteries, the transition metal phosphate may be ground using, for example, a ball mill, a vibration mill or a jet mill, and then subjected to classification or the like to adjust the particle size. The transition metal phosphate may be mixed with an aqueous Na compound solution and further heated, and the obtained transition metal phosphate may be, if desired, mixed with an Na compound or the like and then calcined at a temperature of 600 to 1,200° C. The calcining atmosphere is not particularly limited, and can be optionally selected from, for example, an oxidizing atmosphere containing oxygen, an air atmosphere, an inert atmosphere containing nitrogen, argon or the like, and a reducing atmosphere containing hydrogen. An inert atmosphere and a reducing atmosphere are preferred. Grinding and calcining may be performed twice or more, and the obtained transition metal phosphate may be, if desired, washed or classified.

The obtained transition metal phosphate may be used as a core material, and subjected to a surface treatment of depositing a compound containing one or more elements selected from B, Al, Mg, Ga, In, Si, Ge, Sn, Nb, Ta, W, Mo and transition metal elements on the surface of the particle (core material). Among these, one or more elements selected from B, Al, Mg, Mn, Fe, Co, Ni, Nb, Ta, W and Mo are preferred, and in view of operability, Al is more preferred. Examples of the compound include an oxide, a hydroxide, an oxyhydroxide, carbonate, nitrate, and an organic acid salt such as acetate of the elements above, and a mixture thereof. Among these, an oxide, a hydroxide, an oxyhydroxide, a carbonate and a mixture thereof are preferred, and alumina is more preferred.

The transition metal phosphate can be used as an active material for secondary batteries, such as positive electrode active material for sodium secondary batteries, in an untreated condition or after applying a surface treatment such as deposition above.

Positive Electrode For Sodium Secondary Batteries

The positive electrode for sodium secondary batteries contains an electrically conductive material and a binder in addition to the above-described positive electrode active material and can be usually produced by loading a positive electrode mixture containing the positive electrode active material, an electrically conductive material and a binder on a positive electrode current collector.

Electrically Conductive Material

The electrically conductive material usually contains a carbonaceous material. Examples of the carbonaceous material include graphite powder, carbon black (e.g., Ketjen Black (trade name, produced by Ketjen Black International Company), acetylene black), and a fibrous carbonaceous material. Carbon black is a fine particle and has a large surface area, and therefore, by its addition in a small amount to the positive electrode mixture, the electrically conductive property inside the positive electrode can be increased, and the charge/discharge efficiency and output characteristics can be enhanced. However, addition in an excessively large amount may cause reduction in the bonding established between the positive electrode mixture and the positive electrode current collector by the binder, and increase the internal resistance. The ratio of the electrically conductive material in the positive electrode mixture is usually from 5 to 30 parts by weight per 100 parts by weight of the positive electrode active material powder. In the case of using the later-described fibrous carbonaceous material as the electrically conductive material, the ratio above may be lowered.

In order to increase the electrically conductive property of the positive electrode for sodium secondary batteries, it is sometimes preferred that the electrically conductive material contains a fibrous carbonaceous material. Assuming that the length of the fibrous carbonaceous material is l and the diameter of the cross-section perpendicular to the length direction of the material is m, l/m is usually from 20 to 1,000. Assuming that the length of the fibrous carbonaceous material is l and the volume-based average particle diameter (D50) of primary particles and particles formed by aggregated primary particles in the positive electrode active material is n, l/n is usually from 2 to 100, preferably from 2 to 50. If l/n is less than 2, the electrically conductive property between particles in the positive electrode active material may be insufficient, whereas if it exceeds 100, the bonding between the positive electrode mixture and the positive electrode current collector may decrease. The fibrous carbonaceous material preferably has high electrical conductivity. The electrical conductivity of the fibrous carbonaceous material is measured for a sample shaped to have a fibrous carbonaceous material density of 1.0 to 1.5 g/cm$^3$, and is usually 1 S/cm or more, preferably 2 S/cm or more.

The fibrous carbonaceous material is, for example, a graphitized carbon fiber or a carbon nanotube. The carbon nanotube may be either single-walled or multi-walled. The fibrous carbonaceous material may be prepared and used by pulverizing a commercially available product to achieve l/m and l/n in the ranges above. The pulverization may be either dry pulverization or wet pulverization. The dry pulverization includes pulverization by a ball mill, a rocking mill or a planetary ball mill, and the wet pulverization includes pulverization by a ball mill or a disperser. The disperser includes Dispermat (product name, manufactured by EKO Instruments Co., Ltd.).

Usually, in order to increase the electrically conductive property of the positive electrode for sodium secondary batteries, the amount of the fibrous carbonaceous material is preferably from 0.1 to 30 parts by weight per 100 parts by weight of the positive electrode active material powder.

The electrically conductive material may contain other carbonaceous materials (e.g., graphite powder, carbon black) in addition to the fibrous carbonaceous material. Other carbonaceous materials are preferably spherical or fine-particulate. In the case of using the other carbonaceous material in combination, the amount of the carbonaceous material is usually from 0.1 to 30 parts by weight per 100 parts by weight of the positive electrode active material powder.

Binder

The binder is, for example, a thermoplastic resin, and specific examples thereof include a fluororesin such as polyvinylidene fluoride (hereinafter, sometimes referred to as PVdF), polytetrafluoroethylene (hereinafter, sometimes referred to as PTFE), ethylene tetrafluoride-propylene hexafluoride-vinylidene fluoride-based copolymer, propylene hexafluoride-vinylidene fluoride-based copolymer and ethylene tetrafluoride-perfluorovinyl ether-based copolymer; and a polyolefin resin such as polyethylene and polypropylene. Two or more of these resins may be mixed and used. In the case of using a fluororesin and a polyolefin resin as the binder, the ratio of the fluororesin to the positive electrode mixture is usually from 1 to 10 wt %, and the ratio of the polyolefin resin is usually from 0.1 to 2 wt %. With such a ratio, a positive electrode mixture excellent in the bonding property to the positive electrode current collector can be obtained.

Positive Electrode Current Collector

The positive electrode current collector is, for example, Al, Ni and stainless steel. In view of easy processability into a thin film and inexpensiveness, Al is preferred. The method for loading the positive electrode mixture on the positive electrode current collector includes a method by pressure forming; and a method of pasting the mixture using an organic solvent or the like, applying the paste on the positive electrode current collector, drying it, and then fixing it by pressing or the like. In the case of pasting the mixture, a slurry composed of the positive electrode active material, an electrically conductive material, a binder and an organic solvent is produced. Examples of the organic solvent include an amine-based solvent such as N,N-dimethylaminopropylamine and diethyltriamine; an ether-based solvent such as tetrahydrofuran; a ketone-based solvent such as methyl ethyl ketone; an ester-based solvent such as methyl acetate; and an amide-based solvent such as dimethylacetamide and N-methyl-2-pyrrolidone.

Examples of the method for applying the positive electrode mixture on the positive electrode current collector include a slit die coating method, a screen coating method, a curtain coating method, a knife coating method, a gravure coating method and an electrostatic spraying method. By such a method, a positive electrode for sodium secondary batteries can be produced.

Sodium Secondary Battery

An electrode group is obtained by stacking a separator, a negative electrode and the above-described positive electrode and winding the stack, the obtained electrode group is housed in a container such as battery can, and the electrode group in the can is impregnated with an electrolytic solution composed of an organic solvent containing an electrolyte, whereby a sodium secondary battery can be produced.

The shape of the electrode group includes, for example, a shape giving a circular, elliptical, rectangular or corner-rounded rectangular cross-sectional surface or the like when the electrode group is cut in the direction perpendicular to the winding axis. The shape of the battery includes, for example, a shape such as paper, coin, cylinder and square.

The negative electrode is sufficient if it contains a negative electrode material capable of being doped/dedoped with sodium ions at a lower potential than the positive electrode. The negative electrode includes an electrode obtained by loading a negative electrode mixture containing a negative electrode material on a negative electrode current collector, and an electrode composed of a negative electrode material alone. The negative electrode material includes a material that is a carbonaceous material, a chalcogen compound (e.g., oxide, sulfide), a nitride, a metal or an alloy and can be doped/dedoped with sodium ions at a lower potential than the positive electrode. A mixture of these negative electrode materials may also be used.

Examples of the negative electrode material are described below. Specific examples of the carbonaceous material include graphite such as natural graphite and artificial graphite, cokes, carbon black, pyrolytic carbons, carbon fiber and calcined organic polymer compound, which can be doped/dedoped with sodium ions at a lower potential than the positive electrode. Such a carbonaceous material, an oxide, a sulfide and a nitride may be used in combination, and may be either crystalline or amorphous. Also, such a carbonaceous material, an oxide, a sulfide or a nitride is loaded mainly on a negative electrode current collector and used as a negative electrode.

The shape of the carbonaceous material may be, for example, any of a flake such as natural graphite, a sphere such as mesocarbon microbead, a fiber such as graphitized carbon fiber, and an aggregate of fine powder.

The metal capable of being doped/dedoped with sodium ions at a lower potential than the positive electrode includes sodium metal, silicon metal and tin metal. The alloy capable of being doped/dedoped with sodium ions at a lower potential than the positive electrode includes a sodium alloy such as Na—Al, Na—Ni and Na—Si; a silicon alloy such as Si—Zn; a tin alloy such as Sn—Mn, Sn—Co, Sn—Ni, Sn—Cu and Sn—La; and an alloy such as $Cu_2Sb$ and $La_3Ni_2Sn_7$. Such a metal or alloy is mainly used alone as a negative electrode (for example, used in a foil form).

The negative electrode mixture may contain a binder, if desired. The binder includes a thermoplastic resin, and specific examples thereof include PVdF, thermoplastic polyimide, carboxymethyl cellulose, polyethylene, and polypropylene. In the case where the electrolytic solution does not contain the later-described ethylene carbonate, when a negative electrode mixture containing ethylene carbonate is used, the cycle characteristics and large-current discharge characteristics of the battery obtained may be enhanced.

Examples of the negative electrode current collector include Cu, Ni and stainless steel. In view of resistivity against alloying with sodium and easy processability into a thin film, Cu may be used. The method for loading the negative electrode mixture on the negative electrode current collector is the same as that for the positive electrode. Examples thereof include a method of pressure forming; and a method of pasting the mixture using a solvent or the like, applying the paste on the negative electrode current collector, drying it, and then contact-bonding it by pressing.

As a separator, a member having a form, such as porous film, nonwoven fabric and woven fabric and made of a material of a polyolefin resin, such as polyethylene and polypropylene, a fluororesin or a nitrogen-containing aromatic polymer can be used. Separator can use two or more members, and made of laminated members. Examples of the separator include separators described in Japanese Unexamined Patent Publication Nos. 2000-30686 and 10-324758. A thickness of the separator is preferably smaller as long as the mechanical strength can be maintained, from the standpoint of increase in the volumetric energy density of a battery and decrease in internal resistance thereof. A thickness of the separator is usually about 5 to 200 μm, and preferably about 5 to 40 μm.

The separator preferably has a porous film comprising a thermoplastic resin. In a sodium secondary battery, it is important, when an extraordinary current flows in the battery due to short-circuit between a positive electrode and a negative electrode, or the like, the separator plays a role by which the current is blocked to prevent an overcurrent from flowing (to shutdown). It is required for a separator that the shutdown (clogging of micropores of a porous film when the separator has a porous film containing a thermoplastic resin) is achieved at a low temperature as possible when the temperature exceeds a usual use temperature, and even when the temperature in the battery rises to a certain high temperature after the shutdown, the separator maintain the shutdown state without being ruptured due to the temperature, in other words, have high heat resistance. Such a thermal rupture can be more prevented by using a separator composed of a laminated porous film in which a heat-resistant porous layer containing a heat-resistant material and a porous film containing a thermoplastic resin are stacked with each other. The heat-resistant porous layer can be stacked on both sides of the porous film.

Next, the separator composed of a porous laminate film in which a heat-resistant porous layer comprising a heat-resistant resin and a porous film containing a thermoplastic resin are stacked each other is described below. A thickness of the separator is usually 40 μm or less, preferably 20 μm or less. Assuming that a thickness of the heat-resistant porous layer is A (μm) and a thickness of the porous film is B (μm), the value of A/B is preferably from 0.1 to 1. Considering the ion permeability, the permeability of the separator is, in terms of Gurley permeability, preferably from 50 to 300 seconds/100 ml, more preferably from 50 to 200 seconds/100 ml. A void content of the separator is usually from 30 to 80 vol %, and preferably from 40 to 70 vol %.

In the porous laminate film, the heat-resistant porous layer contains a heat-resistant resin. In order to elevate the ion permeability, a thickness of the heat-resistant porous layer is preferably from 1 to 10 μm, more preferably from 1 to 5 μm, and particularly preferably from 1 to 4 μm to be a thinner heat-resistant porous layer. The heat-resistant porous layer has fine pores, and the size (diameter) of the pore is usually 3 μm or less, preferably 1 μm or less. The heat-resistant porous layer may contain a filler described later.

The heat-resistant resin contained in the heat-resistant porous layer includes polyamide, polyimide, polyamideimide, polycarbonate, polyacetal, polysulfone, polyphenylene sulfide, polyether ketone, aromatic polyester, polyethersulfone and polyetherimide. From the standpoint of further enhancing the heat resistance, polyamide, polyimide, polyamideimide, polyethersulfone and polyetherimide are preferred; and polyamide, polyimide and polyamideimide are more preferred. The heat-resistant resin is more preferably a nitrogen-containing aromatic polymer, such as aromatic polyamide (para-oriented aromatic polyamide, meta-oriented aromatic polyamide), aromatic polyimide and aromatic polyamideimide, still more preferably an aromatic polyamide, and yet still more preferably a para-oriented aromatic polyamide (hereinafter, referred to as "para-aramide"). In addition, the heat-resistant resin also includes poly-4-methylpentene-1, and a cyclic olefin-based polymer. By using such a heat-resistant resin, the heat resistance of the heat-resistant porous layer can be enhanced, i.e. the thermal film rupture temperature can be raised.

The thermal film rupture temperature depends on the types of heat-resistant resin, and is usually 160° C. or more. The thermal film rupture temperature can be elevated to at most about 400° C. in the case of use of the above-described nitrogen-containing aromatic polymer, to at most about 250° C. in the case of use of poly-4-methylpentene-1, and to at most about 300° C. in the case of use of a cyclic olefin-based polymer, as the heat resistant resin, respectively.

The para-aramide is obtained by condensation polymerization of a para-oriented aromatic diamine and a para-oriented aromatic dicarboxylic acid halide, and is substantially composed of a repeating unit where the amide bond is bonded at the para-position or equivalently oriented position of the aromatic ring (for example, the oriented position extending coaxially or in parallel to the opposite direction, such as 4,4'-biphenylene, 1,5-naphthalene, and 2,6-naphthalene). The para-aramide includes a para-aramide having a para-oriented-type and quasi-para-oriented-type structures. Specific examples thereof include poly(paraphenyleneterephthalamide), poly(parabenzamide), poly(4,4'-benzanilideterephthalamide), poly(paraphenylene-4,4'-biphenylenedicarboxylic acid amide), poly(paraphenylene-2, 6-naphthalenedicarboxylic acid amide), poly(2-chloroparaphenyleneterephthalamide), and paraphenyleneterephthalamide/2,6-dichloroparaphenyleneterephthalamide copolymer.

The aromatic polyimide is preferably a wholly aromatic polyimide produced by condensation polymerization of an aromatic diacid anhydride and an aromatic diamine. Specific examples of the diacid anhydride include pyromellitic dianhydride, 3,3',4,4'-diphenylsulfonetetracarboxylic dianhydride, 3,3',4,4'-benzophenonetetracarboxylic dianhydride, 2,2'-bis(3,4-dicarboxyphenyl)hexafluoropropane, and 3,3',4, 4'-biphenyltetracarboxylic dianhydride. Examples of the diamine include oxydianiline, para-phenylenediamine, benzophenonediamine, 3,3'-methylenedianiline, 3,3'-diaminobenzophenone, 3,3'-diaminodiphenylsulfone, and 1,5'-naphthalenediamine. A polyimide soluble in a solvent may be suitably used. Examples of such a polyimide include a polyimide as a polycondensate of 3,3',4,4'-diphenylsulfonetetracarboxylic dianhydride with an aromatic diamine.

Examples of the aromatic polyamideimide include those obtained by condensation polymerization of an aromatic dicarboxylic acid and an aromatic diisocyanate, and those obtained by condensation polymerization of an aromatic diacid anhydride and an aromatic diisocyanate. Specific examples of the aromatic dicarboxylic acid include isophthalic acid and terephthalic acid. Specific examples of the aromatic diacid anhydride include trimellitic acid anhydride. Specific examples of the aromatic diisocyanate include 4,4'-diphenylmethane diisocyanate, 2,4-tolylene diisocyanate, 2,6-tolylene diisocyanate, ortho-tolylene diisocyanate and m-xylylene diisocyanate.

The filler that may be contained in the heat-resistant porous layer may be any one selected from an organic powder, an inorganic powder and a mixture thereof. The average particle diameter of the particle constituting the filler is preferably from 0.01 to 1 μm. Examples of the shape of the filler include an approximately spherical shape, a plate shape, a columnar shape, an acicular particle, a whisker shape and a fibrous shape, and any particles of these shapes may be used. The filler is preferably an approximately spherical particle due to ease in forming uniform pores.

The organic powder as the filler includes a powder composed of an organic material, such as a homopolymer of or a copolymer of two or more kinds of styrene, vinyl ketone, acrylonitrile, methyl methacrylate, ethyl methacrylate, glycidyl methacrylate, glycidyl acrylate and methyl acrylate; a fluororesin, such as polytetrafluoroethylene, tetrafluoroethylene-hexafluoropropylene copolymer, tetrafluoroethylene-ethylene copolymer and polyvinylidene fluoride; a melamine resin; a urea resin; a polyolefin; and polymethacrylate. The organic powders may be used solely, or in admixture of two or more. Among the organic powders, a polytetrafluoroethylene powder is preferred in view of chemical stability.

Examples of the inorganic powder as the filler include a powder composed of an inorganic material, such as metal oxide, metal nitride, metal carbide, metal hydroxide, carbonate and sulfate. Specific examples thereof include a powder composed of alumina, silica, titanium dioxide, or calcium carbonate. The inorganic powders may be used solely, or in admixture of two or more. Among the inorganic powders, an alumina powder is preferred in view of chemical stability. It is preferred that all of the particles constituting the filler be an alumina particle, and more preferred that all of the particles constituting the filler be an alumina particle, and a part or all thereof are an approximately spherical alumina particle.

The content of the filler in the heat-resistant porous layer varies depending on the specific gravity of the material of the filler. For example, in the case where all of the particles constituting the filler are alumina particles, the weight of the filler is usually from 20 to 95 parts by weight, preferably from 30 to 95 parts by weight, assuming that the total weight of the heat-resistant porous layer is 100 parts by weight. These ranges can be appropriately set, depending on the specific gravity of the material of the filler.

In the porous laminate film, the porous film preferably contains a thermoplastic resin. A thickness of the porous film is usually from 3 to 30 μm, preferably from 3 to 20 μm. The porous film has fine pores similarly to the heat-resistant porous layer, and the size of the pore is usually 3 μm or less, preferably 1 μm or less. A void content of the porous film is usually from 30 to 80 vol %, preferably from 40 to 70 vol %. When a temperature of sodium secondary battery exceeds a usual use temperature, the porous film can clog the fine pores due to softening of the thermoplastic resin constituting the porous film.

The thermoplastic resin contained in the porous film includes a resin that is softened at from 80 to 180° C., and a thermoplastic resin which does not dissolve in the electrolytic solution of a sodium secondary battery may be selected. Specific examples of the thermoplastic resin include a polyolefin resin, such as polyethylene and polypropylene, and a thermoplastic polyurethane resin. A mixture of two or more of these resins may be used. In order to activate a shutdown by softening at a lower temperature, the thermoplastic resin preferably contains polyethylene. The polyethylene specifically includes a polyethylene, such as a low-density polyethylene, a high-density polyethylene and a linear polyethylene, and also includes an ultrahigh molecular-weight polyethylene (a molecular weight of one million or more). For further enhancing the piercing strength of the porous film, the thermoplastic resin preferably contains at least an ultrahigh molecular-weight polyethylene. In view of production of the porous film, it is sometimes preferred that the thermoplastic resin contain a wax composed of a polyolefin of low molecular-weight (weight average molecular weight of 10,000 or less).

In the electrolytic solution, the examples of the electrolyte include a sodium salt such as $NaClO_4$, $NaPF_6$, $NaAsF_6$, $NaSbF_6$, $NaBF_4$, $NaCF_3SO_3$, $NaN(SO_2CF_3)_2$, $NaN(SO_2C_2F_5)_2$, $NaN(SO_2CF_3)(COCF_3)$, $Na(C_4F_9SO_3)$, $NaC(SO_2CF_3)_3$, $NaBPh_4$, $Na_2B_{10}Cl_{10}$, NaBOB (BOB means bis (oxalate) borate), sodium salt of lower aliphatic carboxylate, and $NaAlCl_4$. A mixture of two or more thereof may be used. Among these, an electrolyte containing, at least one selected from the group consisting of $NaPF_6$, $NaAsF_6$, $NaSbF_6$, $NaBF_4$, $NaCF_3SO_3$ and $NaN(SO_2CF_3)_2$, which contain fluorine, is preferably used as a sodium salt.

In the electrolytic solution, examples of the organic solvent include carbonates, such as propylene carbonate, ethylene carbonate, dimethyl carbonate, diethyl carbonate, vinylene carbonate, isopropyl methyl carbonate, propylmethyl carbonate, ethylmethyl carbonate, 4-trifluoromethyl-1,3-dioxolan-2-one, and 1,2-di(methoxycarbonyloxy)ethane; ethers, such as 1,2-dimethoxyethane, 1,3-dimethoxypropane, pentafluoropropylmethyl ether, 2,2,3,3-tetrafluoropropyldifluoromethyl ether, tetrahydrofuran, and 2-methyltetrahydrofuran; esters, such as methyl formate, methyl acetate, and γ-butyrolactone; nitrites, such as acetonitrile and butyronitrile; amides, such as N,N-dimethylformamide, and N,N-dimethylacetamide; carbamates, such as 3-methyl-2-oxazolidone; sulfur-containing compounds, such as sulfolane, dimethyl sulfoxide, and 1,3-propanesultone; and those obtained by introducing a fluorine substituent into the organic solvent. Usually, two or more of the organic solvents are mixed and used. Among these, a mixed solvent containing carbonates is preferred, and a mixed solvent of cyclic and non-cyclic carbonates, or a mixed solvent of a cyclic carbonate and eters are more preferred.

A solid electrolyte may also be used in place of the electrolytic solution. Examples of the solid electrolyte include an organic polymer electrolyte, such as polyethylene oxide-based polymer, and polymer containing at least one or more of polyorganosiloxane chains or polyoxyalkylene chains. A so-called gel-type electrolyte holding a nonaqueous electrolyte solution in a polymer can also be used. The use of sulfide electrolyte such as Na2S-SiS2, Na2S-GeS2, Na2S-P2S2, Na2S-B2S3; or inorganic compound electride containing sulfide such as Na2S-SiS2-Na3PO4, Na2S-SiS2-Na2SO4; and NAS I CON-type electrolyte such as NaZr2(PO4)3 may also be used. When such a solid electrolyte is used, safety can be enhanced in some cases. In the case of using a solid electrolyte in the sodium secondary battery of the present invention, the solid electrolyte sometimes works as a separator, and in this case, a separator may not be necessary.

EXAMPLES

The present invention is described in greater detail by referring to Examples, but the present invention is not limited thereto. The powder X-ray diffraction measurement, particle size distribution measurement, BET specific surface area measurement and SEM observation of the transition metal phosphate were performed by the following methods. Also, a coin-type battery for charge/discharge test was produced by the following method.

(1) Powder X-Ray Diffraction Measurement of Transition Metal Phosphate

The measurement was performed under the following conditions by using, as the powder X-ray diffraction apparatus, a powder X-ray diffraction measuring apparatus, Model RINT2500TTR, manufactured by Rigaku Corporation.

X-ray: CuKα
Voltage-current: 40 kV-140 mA
Measuring angle range: 2θ=10-80°
Step: 0.02°
Scan speed: 4°/min
Divergence slit width: (DS) 1°
Scattering slit width: (SS) 1°
Receiving slit width: (RS) 0.3 mm (2) Particle Size Distribution Measurement of Transition Metal Phosphate The measurement was performed using Mastersizer 2000 manufactured by Malvern Instruments, Ltd. as the laser diffraction scattering particle size distribution measuring apparatus. As the dispersion medium, an aqueous 0.2 wt % sodium hexametaphosphate solution was used. As the measured value of D50, a value of particle diameter at which 50% accumulation is observed from the smallest particle side in the cumulative particle size distribution on the volume basis was used.

(3) BET Specific Surface Area Measurement of Transition Metal Phosphate

After drying 1 g of transition metal phosphate powder at 150° C. for 15 minutes in a nitrogen stream, the powder was measured using FlowSorb II2300 manufactured by Micromeritics Instrument Corporation.

(4) SEM Observation of Transition Metal Phosphate

The observation was performed under the condition of an accelerating voltage of 20 kV by using JSM-5500 manufactured by JEOL Datum Ltd as a scanning electron microscope apparatus. Incidentally, as the aspect ratio (a/b) of the particle, 50 particles arbitrarily extracted from the obtained SEM observation photograph were measured for the long diameter a and the short diameter b, and the average value thereof was employed.

(5) Production of Coin-type Battery for Charge/Discharge Test

A positive electrode active material powder described later in Examples, acetylene black (produced by Denki Kagaku Kogyo Kabushiki Kaisha; hereinafter, sometimes referred to as AB) as an electrically conductive material, and PTFE (produced by Daikin Industries, Ltd.) as a binder were mixed and kneaded to give a positive electrode mixture having a positive electrode active material:AB:PTFE weight ratio of 75:20:5. The positive electrode mixture was applied on an SUS-made mesh (#100, 10 mm(φ)) as a positive electrode current collector, and then vacuum-dried at 150° C. for 8 hours to obtain a positive electrode. The weight of the obtained positive electrode was measured, the weight of the positive electrode mixture was calculated by subtracting the weight of the SUS-made mesh from the weight of the positive electrode. Further, the weight of the positive electrode active material powder was calculated from the weight ratio of the positive electrode mixture. The positive electrode obtained, an electrolytic solution prepared by dissolving $NaClO_4$ in propylene carbonate (hereinafter, sometimes referred to as PC) to achieve a concentration of 1 mol/liter (hereinafter, sometimes referred to as $NaClO_4$/PC), a polyethylene porous film as a separator, and metallic sodium as a negative electrode were assembled to produce a coin-type battery (R2032).

A charge/discharge test was performed using the coin-type battery by holding the temperature at 25° C. and under the following conditions:

(Cell Configuration) dipole type
Positive electrode: electrode containing positive electrode active material
Negative electrode: electrode composed of metallic sodium
Electrolyte: 1 M $NaClO_4$/PC (Discharge Conditions)
Voltage range: 1.5-4.2 V
Charging rate: 0.05C rate (a rate at which the battery reaches full charge in 20 hours)
Discharging rate: 0.05C rate (a rate at which the battery reaches full discharge in 20 hours)

Example 1

(A) Synthesis of Transition Metal Phosphate Powder $S_1$ 1.8 g of Sodium hydroxide (NaOH), 2.7 g of diammonium hydrogen phosphate (($NH_4)_2HPO_4$), and 2.0 g of iron (II) chloride tetrahydrate ($FeCl_2 \cdot 4H_2O$) were weighed, and each weighed compound was put in a 100 ml-volume glass-made beaker respectively. Subsequently, 33 g of ion-exchanged water was added to each beaker, and the compound was completely dissolved with stirring to prepare an aqueous solution of each compound. The aqueous sodium hydroxide solution and the aqueous diammonium hydrogenphosphate solution were mixed, and, while thoroughly stirring, the aqueous iron (II) chloride tetrahydrate solution was added thereto to obtain a solid-liquid mixture containing a solid material. The obtained solid-liquid mixture was put in an egg-plant type flask, and the egg-plant type flask was then heated in an oil bath set to 170° C. to obtain a desiccated product after evaporation of water. The desiccated product was collected, then washed with water, filtered and dried to obtain Transition Metal Phosphate Powder $S_1$.

(B) Evaluations of Transition Metal Phosphate Powder $S_1$

Powder $S_1$ was measured by X-ray diffraction and found to be single-phase orthorhombic $NaFePO_4$ (maricite) (FIG. 1). The particle size distribution and the BET specific surface area of Powder $S_1$ were measured. As a result, D50 was 1.3 μm, and the BET specific surface area was 20 m²/g. The SEM observation of Powder $S_1$ was performed, and revealed that the powder contained bar-like particles. Assuming that the long axis of a particle is a and the short axis is b, the average of the aspect ratio a/b was 9 (FIG. 2). Thereafter, a coin-type battery was produced using Powder $S_1$ as the positive electrode active material. The obtained battery was subjected to a charge/discharge test. As a result, it was confirmed that the battery is chargeable/dischargeable. The discharge capacity in the 5th cycle was 78 mAh/g.

Example 2

(A) Synthesis of Transition Metal Phosphate Powder $S_2$

Transition Metal Phosphate Powder $S_2$ was obtained in the same manner as in Example 1, except that a separation product was obtained through solid-liquid separation by filtration in place of the desiccated product obtained by evaporating water, and the separation product was washed with water, then filtered and dried.

(B) Evaluations of Transition Metal Phosphate Powder $S_2$

Figure 3:
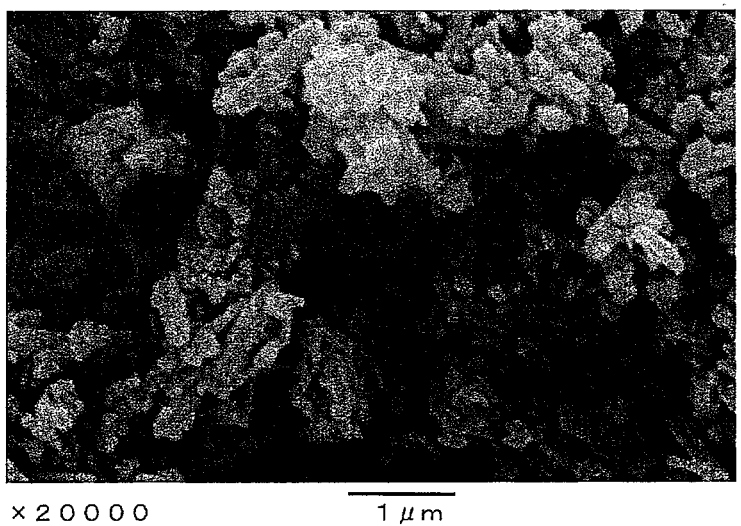
FIG. 3 shows an SEM observation photograph in Example 2.

Powder $S_2$ was measured by X-ray diffraction, and found to be single-phase orthorhombic $NaFePO_4$ (FIG. 1). The particle size distribution and the BET specific surface area of Powder $S_2$ were measured, as a result, D50 was 1.8 μm and the BET specific surface area was 36 m²/g. The SEM observation of Powder $S_2$ was performed, and revealed that the powder contained bar-like particles. Assuming the long axis of a particle is a and the short axis is b, the average of the aspect ratio a/b was 5 (FIG. 3). Thereafter, a coin-type battery was produced using Powder $S_2$ as the positive electrode active material, and subjected to a charge/discharge test. As a result, it was confirmed that the battery is chargeable/dischargeable, and the discharge capacity in the 5th cycle was 80 mAh/g.

Example 3

(A) Synthesis of Transition Metal Phosphate Powder $S_3$

Transition Metal Phosphate Powder $S_3$ was obtained in the same manner as in Example 1, except that the solid-liquid mixture was added with acetylene black as an electrically conductive material in an amount of 10 wt % based on the obtained transition metal phosphate, and these were stirred and mixed.

(B) Evaluations of Transition Metal Phosphate Powder $S_3$

Figure 4:
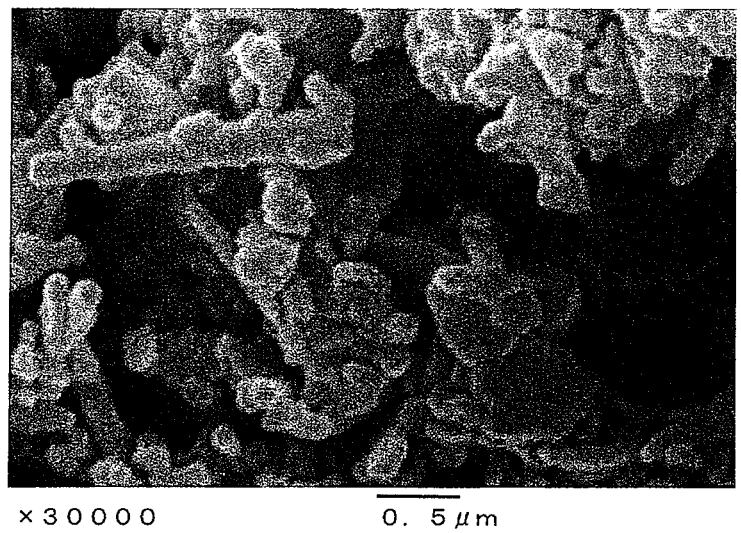
FIG. 4 shows an SEM observation photograph in Example 3.

Powder $S_3$ was measured by X-ray diffraction, and found to be single-phase orthorhombic $NaFePO_4$ (FIG. 1). The particle size distribution and the BET specific surface area of Powder $S_3$ were measured, as a result, D50 was 2.6 µm and the BET specific surface area was 32 m²/g. The SEM observation of Powder $S_3$ was performed, and revealed that the powder contained bar-like particles and acetylene black was uniformly attached to the particle (FIG. 4). Also, assuming the long axis of a particle is a and the short axis is b, the average of the aspect ratio a/b was 7. Thereafter, a coin-type battery was produced using Powder $S_3$ as the positive electrode active material, and subjected to a charge/discharge test. As a result, it was confirmed that the battery is chargeable/dischargeable, and the discharge capacity in the 5th cycle was 85 mAh/g.

Example 4

(A) Synthesis of Transition Metal Phosphate Powder $S_4$

Transition Metal Phosphate Powder $S_4$ was obtained in the same manner as in Example 1 except that 2 mL of an aqueous phosphoric acid ($H_3PO_4$) solution (phosphoric acid concentration: 85 wt %, specific gravity: 1.69) was used in place of 2.7 g of diammonium hydrogenphosphate.

(B) Evaluations of Transition Metal Phosphate Powder $S_4$

Figure 5:
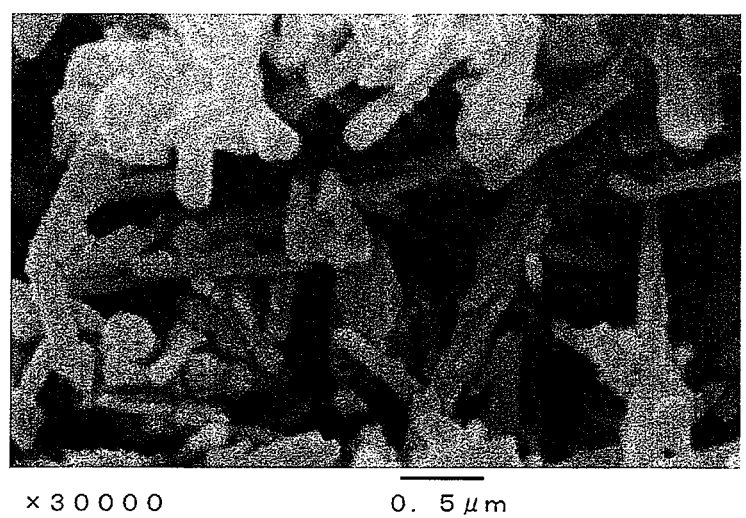
FIG. 5 shows an SEM observation photograph in Example 4.

Powder $S_4$ was measured by X-ray diffraction, and found to be single-phase orthorhombic $NaFePO_4$ (FIG. 1). The particle size distribution and the BET specific surface area of Powder $S_4$ were measured, as a result, D50 was 0.35 µm and the BET specific surface area was 18 m²/g. The SEM observation of Powder $S_4$ was performed, and revealed that the powder contained bar-like particles and acetylene black was uniformly attached to the particle (FIG. 5). Also, assuming the long axis of a particle is a and the short axis is b, the average of the aspect ratio a/b was 6. Thereafter, a coin-type battery was produced using Powder $S_4$ as the positive electrode active material, and subjected to a charge/discharge test. As a result, it was confirmed that the battery is chargeable/dischargeable, and the discharge capacity in the 5th cycle was 75 mAh/g.

Example 5

(A) Synthesis of Transition Metal Phosphate Powder $S_5$ 3.5 g of Sodium hydroxide (NaOH), 3.1 g of manganese(II) chloride tetrahydrate ($MnCl_2 \cdot 4H_2O$), and 2 ml of an aqueous phosphoric acid ($H_3PO_4$) solution (phosphoric acid concentration: 85 wt %, specific gravity: 1.69) were weighed, and each weighed compound was put in a 100 ml-volume glass-made beaker respectively. Subsequently, 33 g of ion-exchanged water was added to each beaker, and the compound was completely dissolved with stirring to prepare an aqueous solution of each compound. The aqueous sodium hydroxide solution and the aqueous manganese (II) chloride tetrahydrate solution were mixed and while thoroughly stirring, the aqueous phosphoric acid solution was added thereto to obtain a solid-liquid mixture containing a solid material. The obtained solid-liquid mixture was put in an egg-plant type flask, and the egg-plant type flask was then heated in an oil bath set to 170° C. to effect evaporation to dryness until water was evaporated, whereby a desiccated product was obtained. The desiccated product was collected, then washed with water, filtered and dried to obtain Transition Metal Phosphate Powder $S_5$.

(B) Evaluations of Transition Metal Phosphate Powder $S_5$

Figure 6:
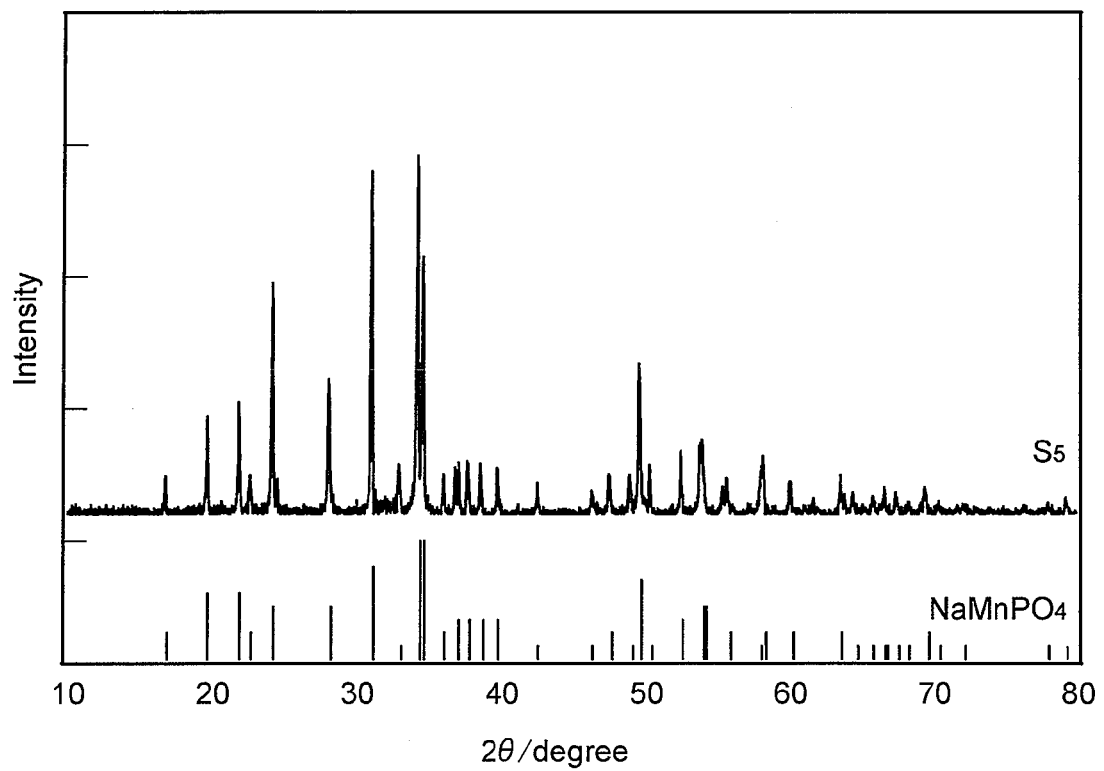
FIG. 6 shows a powder X-ray diffraction analysis result in Example 5.

Powder $S_5$ was measured by X-ray diffraction and found to be single-phase orthorhombic $NaMnPO_4$ (FIG. 6). The particle size distribution and the BET specific surface area of Powder $S_5$ were measured, as a result, D50 was 1.67 µm and the BET specific surface area was 4.0 m²/g. The SEM observation of Powder $S_5$ was performed, and spherical particles were confirmed (FIG. 7). Thereafter, a coin-type battery was produced using Powder $S_5$ as the positive electrode active material, and subjected to a charge/discharge test. As a result, it was confirmed that the battery is chargeable/dischargeable.

Comparative Example 1

(A) Synthesis of Comparative Powder $R_1$

Each of 3.2 g of iron sesquioxide ($Fe_2O_3$), 2.1 g of sodium carbonate ($Na_2CO_3$), and 5.1 g of diammonium hydrogenphosphate (($NH_4$)$_2HPO_4$) was weighed as the raw material, and the raw materials were thoroughly pulverized and mixed to obtain a raw material mixture. The raw material mixture was filled in an alumina boat, and calcined by holding it at a temperature of 750° C. for 8 hours in an electric furnace while flowing a nitrogen gas at 5 liter/min to obtain Comparative Powder $R_1$.

(B) Evaluations of Comparative Powder $R_1$

Figure 8:
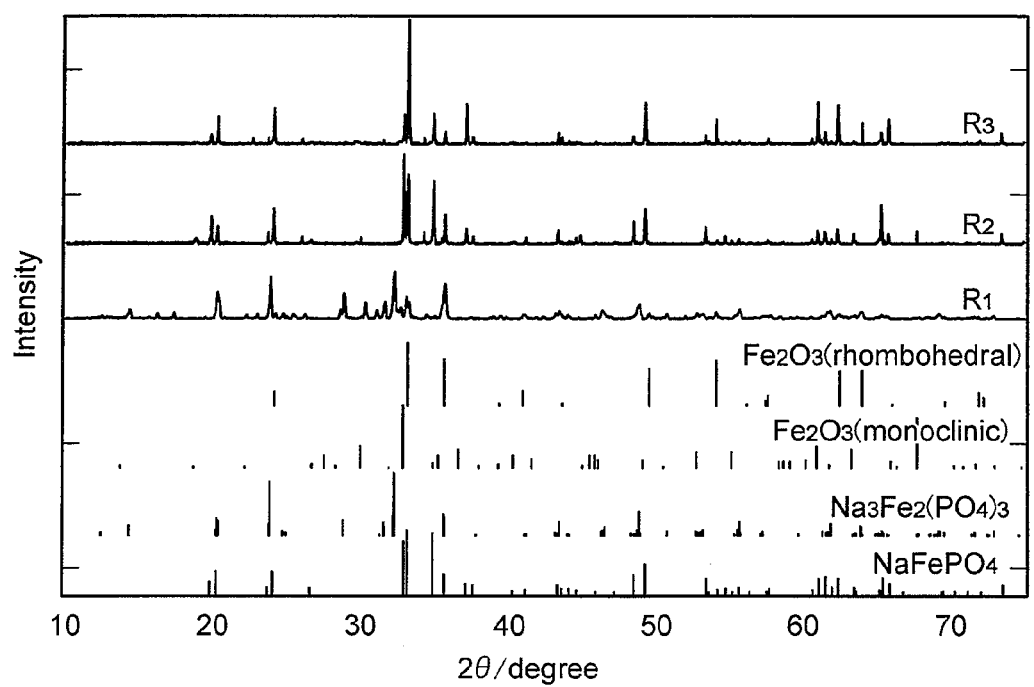
FIG. 8 shows powder X-ray diffraction analysis results in Comparative Examples 1 to 3.
Figure 9:
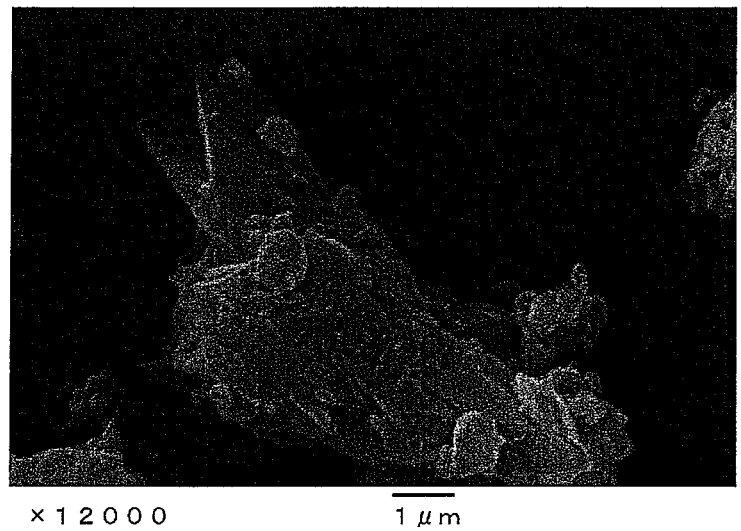
FIG. 9 shows an SEM observation photograph in Comparative Example 1.

Powder $R_1$ was measured by X-ray diffraction, and the main phase was found to be monoclinic $Na_3Fe_2(PO_4)_3$, failing in obtaining single-phase $NaFePO_4$ (FIG. 8). The particle size distribution and the BET specific surface area of Powder $R_1$ were measured, as a result, D50 was 14 µm and the BET specific surface area was 0.10 m²/g. The SEM observation of Powder $R_1$ was performed, and revealed that the particle shape is a random shape (FIG. 9). Thereafter, a coin-type battery was produced using Powder $R_1$ as the positive electrode active material, and subjected to a charge/discharge test. As a result, it was confirmed that the battery is chargeable/dischargeable, but the discharge capacity in the 5th cycle was as low as 1 mAh/g.

Comparative Example 2

(A) Synthesis of Comparative Powder $R_2$

Each of 5.1 g of iron oxalate dihydrate ($FeC_2O_4 \cdot 2H_2O$), 1.5 g of sodium carbonate ($Na_2CO_3$), and 3.8 g of diammonium hydrogenphosphate (($NH_4$)$_2HPO_4$) was weighed as the raw material, and the raw materials were thoroughly pulverized and mixed to obtain a raw material mixture. The raw material mixture was filled in an alumina boat, and calcined by holding it at a temperature of 750° C. for 24 hours in an electric furnace while flowing a nitrogen gas at 5 liter/min to obtain Comparative Powder $R_2$.

(B) Evaluations of Comparative Powder $R_2$

Figure 10:
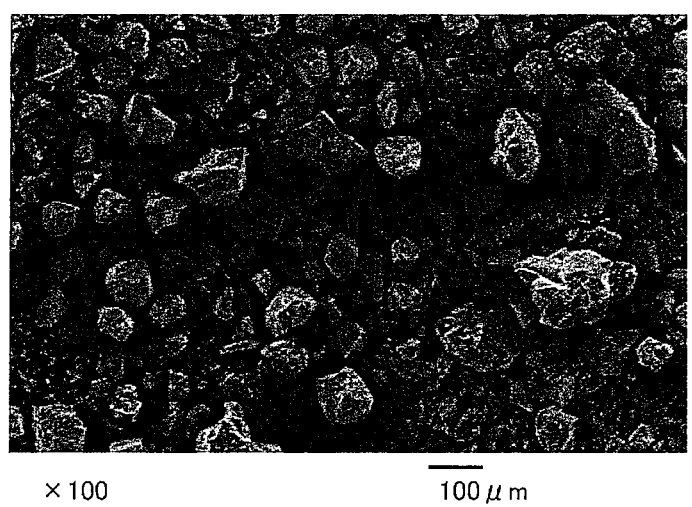
FIG. 10 shows an SEM observation photograph in Comparative Example 2.

Powder $R_2$ was measured by X-ray diffraction, and the main phase was found to be monoclinic $Fe_2O_3$, failing in obtaining single-phase $NaFePO_4$ (FIG. 8). The particle size distribution and the BET specific surface area of Powder $R_2$ were measured, as a result, D50 was 30 µm and the BET specific surface area was 0.26 m²/g. The SEM observation of Powder R₂ was performed, and revealed that the particle shape is a random shape (FIG. 10). Thereafter, a coin-type battery was produced using Powder R₂ as the positive electrode active material, and subjected to a charge/discharge test. As a result, the discharge capacity in the 1st cycle was as very low as 2 mAh/g, and charge/discharge could not be continued until the 5th cycle.

Comparative Example 3

(A) Synthesis of Comparative Powder R₃

Comparative Powder R₃ was obtained in the same manner as in Comparative Example 2, except for changing the temperature at the calcination to 800° C.

(B) Evaluations of Comparative Powder R₃

Figure 11:
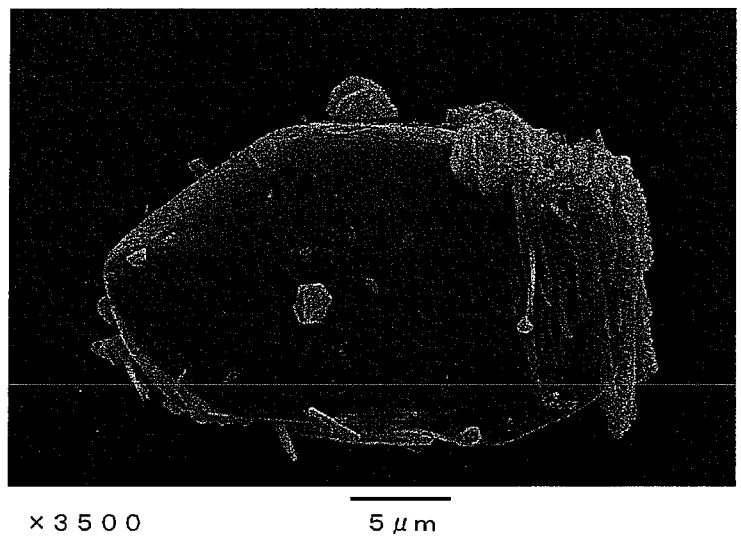
FIG. 11 shows an SEM observation photograph in Comparative Example 3.

Powder R₃ was measured by X-ray diffraction, and the main phase was found to be rhombohedral $Fe_2O_3$, failing in obtaining single-phase $NaFePO_4$ (FIG. 8). The particle size distribution and the BET specific surface area of Powder R₃ were measured, as a result, D50 was 17 μm and the BET specific surface area was 0.47 m²/g. The SEM observation of Powder R₃ was performed, and revealed that the particle shape is a random shape (FIG. 11). Thereafter, a coin-type battery was produced using Powder R₃ as the positive electrode active material, and subjected to a charge/discharge test. As a result, the discharge capacity in the 1st cycle was as very low as 1 mAh/g, and charge/discharge could not be continued until the 5th cycle.

Production Example 1

Production Of Porous Laminate Film (1) Production of Coating Liquid

After dissolving 272.7 g of calcium chloride in 4,200 g of N-methyl-2-pyrrolidone (NMP), 132.9 g of para-phenylenediamine was added and completely dissolved therein. To the obtained solution, 243.3 g of terephthalic acid dichloride was gradually added to effect the polymerization, and thereby obtain a para-aramide. The obtained solution was further diluted with NMP to obtain a para-aramide solution (A) having a concentration of 2.0 wt %. To 100 g of the obtained para-aramide solution, 2 g of alumina powder (a) (Alumina C, produced by Nippon Aerosil Co., Ltd., average particle diameter: 0.02 μm), and 2 g of alumina powder (b) (Sumicorundum AA03, produced by Sumitomo Chemical Co., Ltd., average particle diameter: 0.3 μm), as a filler in total of 4 g, were added and mixed. The resulting mixture was subjected to a nanomizer three times, filtered with a 1,000-mesh metal screen, and defoamed under reduced pressure to produce a coating slurry (B). The amount of the alumina powder (filler) was 67 wt %, based on the total weight of the para-aramide and alumina powder.

(2) Production and Evaluation of Porous Laminate Film

As a porous film which can effect shutdown, a polyethylene porous film (film thickness of 12 μm, air permeability of 140 seconds/100 ml, average pore diameter of 0.1 μm, void content of 50%) was used. The polyethylene porous film above was fixed on a 100 μm-thick PET film, and the coating slurry (B) was applied on the porous film by a bar coater manufactured by Tester Sangyo Co,. Ltd. The coated porous film on the PET film was, while maintaining the integrity, dipped in water, which is a poor solvent, to precipitate a para-aramide porous film (heat-resistant porous layer). After that, the solvent was dried to yield a porous laminate film in which a heat-resistant porous layer and a polyethylene porous film were laminated each other. The thickness of the porous laminate film was 16 μm, and the thickness of the para-aramide porous layer (heat-resistant porous layer) was 4 μm. The air permeability of the porous laminate film was 180 seconds/100 ml, and the void content was 50%. The cross-section of the heat-resistant porous layer in the porous laminate film was observed by a scanning electron microscope (SEM), as a result, the heat-resistant porous layer was found to have relatively small pores of approximately 0.03 to 0.06 μm and relatively large pores of approximately 0.1 to 1 μm. Incidentally, evaluations of the porous laminate film were performed as in the followings.

(A) Thickness Measurement

The thicknesses of the porous laminate film and the polyethylene porous film were measured in accordance with JIS standards (K7130-1992). The thickness of the heat-resistant porous layer was determined by subtracting the thickness of the polyethylene porous film from the thickness of the porous laminate film.

(B) Measurement of Air Permeability by Gurley Method

The air permeability of the porous laminate film was measured based on JIS P8117 by a digital-timer type Gurley densometer manufactured by Yasuda Seiki Seisakusho, Ltd.

(C) Void Content

The obtained porous laminate film sample was cut into a square shape which is 10 cm on each side, and the weight W (g) and the thickness D (cm) were measured. The weight (Wi (g)) of each layer in the sample was determined, the volume of each layer was determined from Wi and the true specific gravity (true specific gravity i (g/cm³)) of each layer, and the void content (vol %) was determined according to the following formula:

Void content (vol %)=100×{1−(W1/true specific gravity 1+W2/true specific gravity 2+. . . +Wn/true specific gravity n)/(10×10×D)}

When the porous laminate film obtained by Production Example 1 is used as a separator, the sodium secondary batteries can more successfully prevent thermal film rupture.

Industrial Applicability

According to the present invention, a transition metal phosphate suitably usable as a positive electrode active material for sodium secondary batteries is provided. The sodium secondary battery has a high capacity and therefore, can be used for various applications including not only small-size applications such as potable electronic device, but also mid-/large-size applications such as hybrid vehicle and electric power storage.

The invention claimed is:

1. A transition metal phosphate, containing sodium (Na), phosphorus (P) and a transition metal element; having a BET specific surface area of 3 m²/g to 50 m²/g; and being represented by the following formula (I):

$$Na_xM_yPO_4 \qquad (I)$$ 

wherein x is from more than 0 and not more than 1.5, y is from 0.8 to 1.2, and

M is one or more transition metal elements.

2. The transition metal phosphate according to claim 1, having an orthorhombic crystal structure.

3. The transition metal phosphate according to claim 1 wherein M contains Fe or Mn.

4. The transition metal phosphate according to claim 1, wherein the transition metal phosphate is composed of particles, and D50 of the particles is from 0.01 to 50 μm (D50 indicates the value of particle diameter at which the cumulative volume calculated from the smallest particle diameter side reaches 50% in the volume-based cumulative particle size distribution).

5. A positive electrode active material for sodium secondary batteries, the material comprising the transition metal phosphate according to claim 1.

6. A positive electrode for sodium secondary batteries, the electrode comprising the positive electrode active material according to claim 5.

7. A sodium secondary battery, comprising the positive electrode according to claim 6.

8. The sodium secondary battery according to claim 7, which further comprises a separator.

9. The sodium secondary battery according to claim 8, wherein the separator comprises a porous laminate film in which a heat-resistant porous layer containing a heat-resistant resin and a porous film containing a thermoplastic resin are stacked each other.

10. A process for producing the transition metal phosphate of claim 1, the process comprising the following steps (1) and (2):
   (1) a step of bringing a phosphorus (P) source, a sodium (Na) source, an M source (M is one or more transition metal elements) and water into contact with each other, and obtaining a liquid material thereby, and
   (2) a step of separating water from the liquid material and obtaining a transition metal phosphate thereby.

11. The production process according to claim 10, wherein, in the step (1), an aqueous solution containing P and Na is brought into contact with an M compound or an aqueous solution containing an M compound and obtain the liquid material thereby.

12. The production process according to claim 10, wherein, in the step (1), an aqueous solution containing Na and M is brought into contact with an aqueous solution containing P and obtain the liquid material thereby.

13. The production process according to claim 10, wherein M contains a divalent transition metal element.

14. The production process according to claim 10, wherein M contains Fe or Mn.

15. The production process according to claim 10, wherein the step (2) comprises a step of evaporating water.

16. The production process according to claim 15, wherein the evaporation is performed by heating.

\* \* \* \* \*